A. S. SPIEGEL.
ROOFING MACHINE.
APPLICATION FILED AUG. 26, 1916.
1,244,654.
Patented Oct. 30, 1917.
2 SHEETS—SHEET 1.
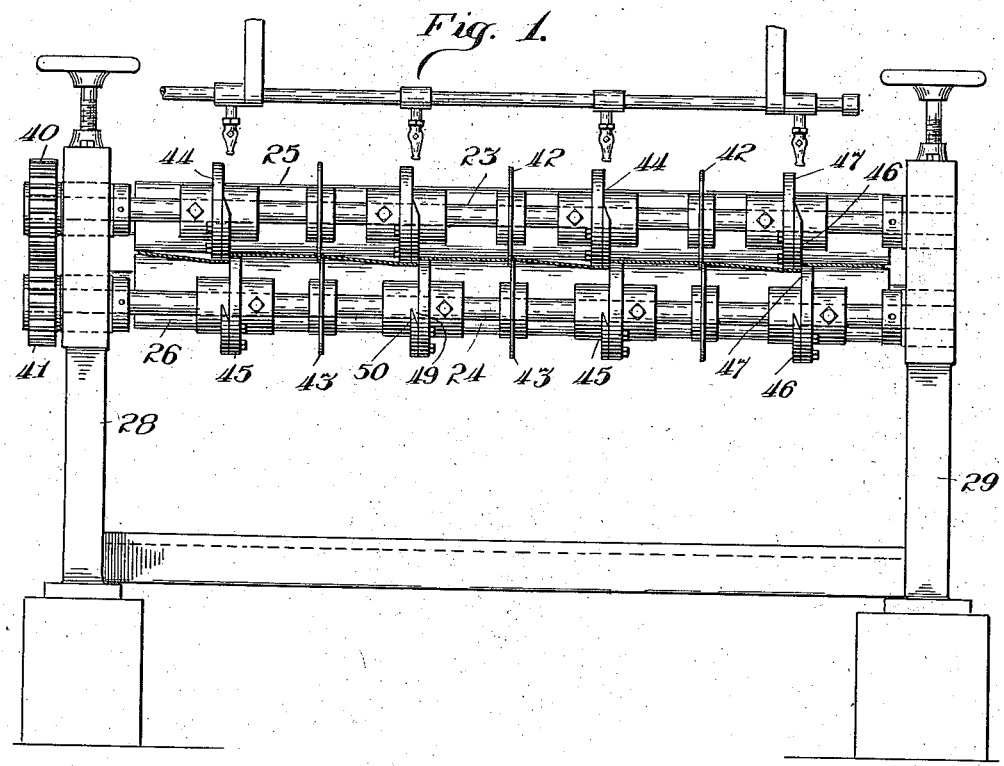
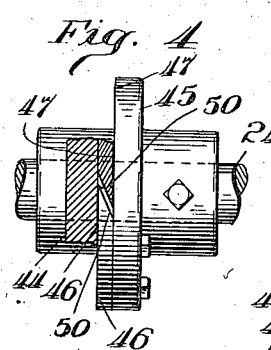
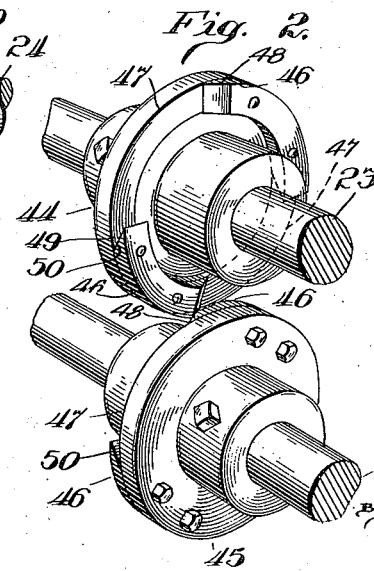
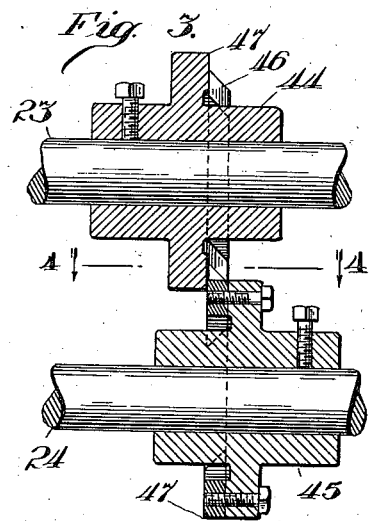
Inventor
Alexander S. Spiegel
By Gillson & Gillson
Attorneys.

A. S. SPIEGEL.
ROOFING MACHINE.
APPLICATION FILED AUG. 26, 1916.
1,244,654.
Patented Oct. 30, 1917.
2 SHEETS—SHEET 2.
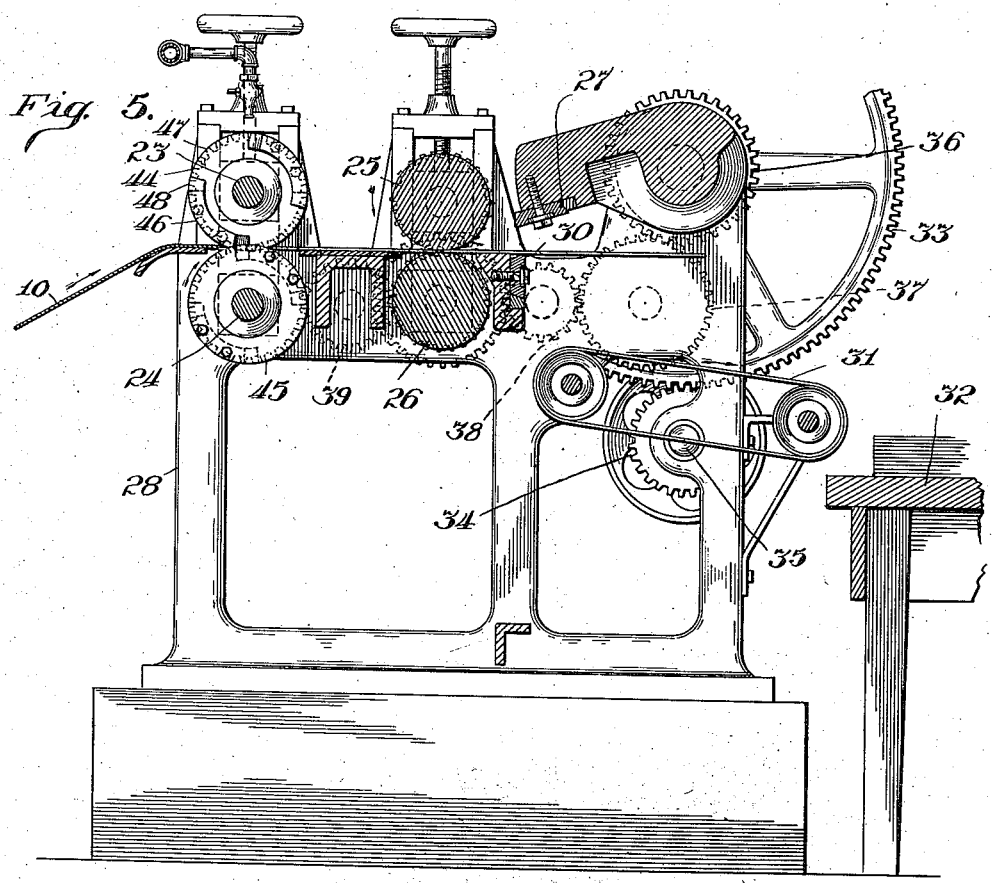
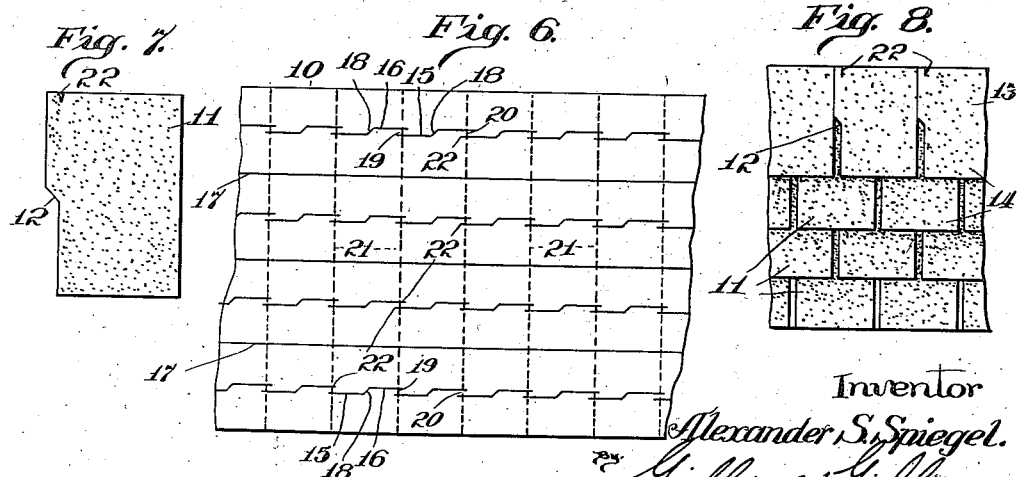
Inventor
Alexander S. Spiegel.
Gillson & Gillson
Attorneys.

UNITED STATES PATENT OFFICE.

ALEXANDER S. SPIEGEL, OF CHICAGO, ILLINOIS.

ROOFING-MACHINE.

1,244,654.   Specification of Letters Patent.   Patented Oct. 30, 1917.

Application filed August 26, 1916. Serial No. 117,003.

*To all whom it may concern:*

Be it known that I, ALEXANDER S. SPIEGEL, a citizen of the United States, and resident of Chicago, county of Cook, and State of Illinois, have invented certain new and useful Improvements in Roofing-Machines, of which the following is a specification, and which are illustrated in the accompanying drawings, forming a part thereof.

The invention relates to machines for the manufacture of prepared roofings and has especial reference to cutting apparatus for dividing a web of prepared roofing material into separate roofing elements of a special shape designed to show a series of slotted openings in the weather or exposed portion of each row or layer of the roofing elements, when laid upon the roof, without the openings being continued through the lapped or covered portion of the layer. The object of the invention is to provide a machine of the kind described, comprising rotary cutters adapted to operate progressively upon a continuously moving web or prepared roofing for effecting a rapid production of roofing elements of the desired shape.

In the accompanying drawings,

Figure 1 is an end elevation showing a machine embodying the features of improvement provided by the invention, viewed in the direction of the travel of material through the same.

Fig. 2 is a detail perspective view showing a pair of the coöperating rotary cutting elements and the supporting shafts upon which they are mounted, Fig. 3 is a detail transverse sectional view of the parts illustrated in Fig. 2, the supporting shafts being shown in elevation, Fig. 4 is a detail plan sectional view taken on the line 4—4 of Fig. 3, Fig. 5 is a central longitudinal sectional view of the machine with a receiving table for the finished product shown in elevation, Fig. 6 is a detail plan view of the web of prepared roofing material which may be operated upon by the machine, the longitudinal cuts produced in the web by the said machine being shown in full lines and the lines of transverse cutting being indicated by dotted lines, Fig. 7 is a plan view showing an individual roofing element of a form which may be produced by the said machine, Fig. 8 is a plan view showing a detail of roof covering comprising the roofing elements illustrated in Fig. 7.

The particular machine illustrated in the drawing is especially adapted for carrying out the improved method of manufacturing shingles forming the subject of my Patent No. 1,172,068, dated Feb. 15, 1916. When so arranged the said machine serves for dividing a continuous web, as 10, (Fig. 6) of roofing material into the so-called "self-spacing" shingles 11, (Fig. 7). The self-spacing shingles 11 are characterized by being formed with a shoulder 12 at one side. When so constructed they may be laid upon the roof with the overlapped or covered portions of adjacent shingles in a single row, as 13, (Fig. 8) in close contact, while the exposed or weather portions of the shingles are separated by intervening spaces 14.

In forming the said shingle 11, the web 10 is cut upon alternating longitudinal lines, with a series of pairs of slits 15, 16, and with a continuous longitudinal slit 17, respectively. The adjacent ends of the slits 15, 16 of each pair are connected by substantially transverse cuts 18 and the remote ends of the slits 15, 16, of each pair overlap the ends of the other slits of the next adjacent pairs, as at 19 and 20. The web 10 is also divided upon transverse lines 21 intersecting the overlapped portions 19, 20, of the slits 15, 16 of adjacent pairs. These several cuts serve to divide the entire web 10, without waste, into shingles 11, which are all alike. The substantially transverse cuts 18, connecting the adjacent ends of the slits 15, 16 of each pair, serve to produce the shoulder 12 of the shingle and the overlapping of the longitudinal slits, as at 19, 20, permits of considerable latitude in the placing of the transverse cuts 21 without interfering with the complete separation of the individual shingles. Obviously the transverse cuts 21 are usually located intermediate the ends of the overlapped portions 19, 20, of the slits 15, 16 of adjacent pairs. Under these circumstances, each shingle 11 is formed with a cut 22 extending into the same at one end. As this cut 22 occurs in that part of the shingle which is covered by shingles of the overlying rows 13 upon the roof it is not at all objectionable.

The operative parts of the improved machine may comprise the upper and lower rotary cutter shaft 23 and 24, a pair of feed rolls 25, 26, and a rotary chopping blade 27. As shown, these parts extend between and are journaled at their opposite ends in side frames 28 and 29 and the rotary chopping blade 27 coöperates with a stationary transverse cutting blade 30, which is firmly held in position by having its opposite ends secured to the said side frames. Preferably the parts are arranged with the cutter shafts 23, 24 and the chopping blade 27 located at opposite sides of the feed rolls 25, 26. When so organized the web 10 preferably moves in the direction indicated by the arrow on Fig. 5, and a continuously moving delivery apron 31 is located below and beyond the stationary cutting blade 30 for receiving the separated shingles as 11, and discharging the same upon a suitable support, as the receiving table 32.

Power may be applied from any convenient source (not shown) but the operating parts are preferably so geared together that the chopping blade 27 makes two revolutions for each revolution of the cutter shafts 23 and 24 and the surface speed of the feed rolls 25, 26 is suitably proportioned to the operation of the cutter shafts and chopping blade. As shown, a large gear 33 is mounted on the spindle of the chopping blade 27 at one end and this gear meshes with a driving gear 34 mounted upon a counter shaft 35 to which the power may be applied. A second gear 36 mounted upon one of the spindles of the chopping blade 27 drives the feed rolls 25, 26 and the cutter shafts 23, 24 through idlers 37, 38 located between the gear 36 and the feed roll 26, and an idler 39 located between the feed roll 26 and the cutter shaft 24. The two feed rolls 25, 26 and the two cutter shafts 23, 24 are each geared together for coöperative rotation in opposite directions, as at 40, 41 (Fig. 1).

The cutter shafts 23, 24 carry a plurality of sets of slitters 42, 43 for making the continuous longitudinal cuts 17 (Fig. 6). These shafts also carry the pairs of coacting rotary cutters 44, 45. The cutters 44, 45 alternate with the slitters 42, 43 along the shafts 23, 24 and serve for making the slits 15, 16 and the connecting transverse cuts 18. Preferably the cutters 44, 45 are so designed that each pair of cutters serves for making two pairs of the longitudinal cuts 15, 16 and a connecting transverse cut 18 between the longitudinal cuts 15—16 of each of said pairs at each revolution of the cutter shafts 23, 24. As shown, the two cutters 44, 45 of each pair are of similar but mating construction. Each comprises the two pairs of relatively offset circumferential cutting shoulders 46, 47 and the two intermediate transverse cutting shoulders 48. The corresponding shoulders 48 of the two cutters 44, 45 of each pair coöperate and the shoulders 46 of each cutter coöperates with the shoulder 47 of the other cutter of the same pair.

The circumferential cutting shoulders 46, 47 of each pair upon each cutter 44, 45 extend in opposite directions from one of the transverse shoulders 48 a sufficient distance to overlap at one side of the cutter, as at 49, Fig. 2. The connecting shoulders, as 50, however, are so placed upon the two cutters 44, 45, of each pair that they do not coöperate as cutting edges but are spaced apart at their nearest approach during the rotation of the shafts 23, 24, as most clearly shown in Fig. 4. The rotary chopping blade 27 serves for cutting the web 10 upon the transverse lines 21 (Fig. 6) and for discharging the separated shingles 11 upon the delivery apron 31.

I claim as my invention,—

1. In a machine for cutting a web of roofing material into roofing elements, the combination of a pair of rotary cutters having a single pair of coacting transverse cutting edges and two pairs of coacting circumferential cutting edges, the two circumferential cutting edges on each cutter extending in opposite directions from the two ends of the transverse cutting edge on the same cutter and being of such length that their ends remote from the said transverse cutting edge overlap whereby the said cutters are arranged to cut the said web with a longitudinal series of transverse slits and pairs of longitudinal slits extending in opposite directions from the two ends of the transverse slits with the ends of adjacent longitudinal slits remote from the transverse slits overlapped and means for severing the web transversely in lines intersecting the said overlapped ends of the longitudinal slits.

2. In a machine for cutting a web of roofing material into roofing elements, the combination of a pair of oppositely rotating parallel shafts having a series of pairs of coacting slitters and a pair of rotary cutters between each two adjacent pairs of slitters and beyond the last pair of slitters at each end of the series, the rotary cutters of each pair having a single pair of coacting transverse cutting edges, and two pairs of coacting circumferential cutting edges, the two circumferential cutting edges on each cutter extending in opposite directions from the two ends of the transverse cutting edge on the same cutter and being of such length that their ends remote from the said transverse cutting edge overlap, whereby the said web is cut upon alternating longitudinal lines with a continuous longitudinal slit and a series of transverse slits with pairs of longitudinal slits extending from the two ends of the transverse slits and the ends of adjacent longitudinal slits remote from the transverse slits overlapped and means for severing the web transversely in lines intersecting the said overlapped ends of the longitudinal slits cut by all of the pairs of the said rotary cutters.

ALEXANDER S. SPIEGEL.